United States Patent Office 3,274,003
Patented Sept. 20, 1966

3,274,003
FORMULATIONS FOR INFANT FEEDING
Frederick William Zilliken, Kapittelweg, Netherlands, assignor to American Home Products Corporation, New York, N.Y., a corporation of Delaware
No Drawing. Filed Aug. 5, 1964, Ser. No. 387,772
6 Claims. (Cl. 99—54)

This invention relates to food products and, more particularly, to food products which are suitable for use in the feeding of infants.

More specifically, the invention is directed to the incorporation of compounds which have an unexpectedly high activity or ability for promoting the growth of microorganisms such as Lactobacillus bifidus in the intestinal tract of infants. It has now been discovered that if one of the group consisting of N-octanoyl, N-benzoyl or N-carboethoxy-d-glucosamine is added to an infant feeding formula in the amounts hereinafter defined, the growth of L. bifidus, especially those strains such as L. bifidus var. penn., in the intestinal tracts of infants who ingest such compositions, will be substantially enhanced. It has been found that the compounds identified provide such enhancement to a greater degree, in the order of tenfold or more over previously utilized compounds of a somewhat related nature. More importantly, it has been found that the compounds of the present invention provide the unexpectedly enhanced growth support of L. bifidus at substantially reduced toxicity levels.

The composition to which the compounds are added contain the usual fat, protein, carbohydrates, fatty acid, amino acid, vitamin and mineral constituents necessary for infant growth. Such compositions are normally based on cow's milk and are so constituted as to biologically and physiologically function as the equivalents of human milk.

A typical commercially available infant feeding composition, derived from cow's milk but having major physical and chemical properties essentially the same as human milk, contains approximately 1.5% of protein, 7.0% of carbohydrate, 3.5% of fat, 0.38% of ash and a mineral constituent, such as iron, present in a relatively minor amount as, for example, approximately 0.0005%, as the food is made up as a liquid ready to feed to the infant. Such a composition is, in many respects, similar to human milk, will supply approximately 20 calories per fluid ounce, and contains, in addition, various vitamin constituents, such as vitamin A, thiamin, riboflavin, vitamin C, vitamin D and niacin, all present (with the exception of vitamin C) in amounts considerably in excess of the amounts in which those vitamins are present in an equal volume of human or breast milk.

It is to be understood, of course, that the composition described is but one of many available infant feeding formulas, all based on, or derived from, cow's milk. Such compositions are usually supplied, either in a concentrated liquid form which is adapted to be diluted with water before use, or as a solid powder or granular composition which is dissolved in water in specified proportions to provide solutions of specified concentrations.

While some of these commercially available infant food compositions are similar to human milk in their major physical and chemical properties, there are, however, certain important differences in the predominating microorganisms present in the intestinal bacterial flora characteristic of an infant fed exclusively with human or breast milk, as compared with the intestinal flora of an infant who is fed with one of the commercial food formulas based on, or derived from, cow's milk. The intestinal flora of the breast fed infant is characterized by the presence therein of the microorganism Lactobacillus bifidus as the predominating microorganism.

As seen in smears when freshly isolated from the infant feces, the L. bifidus organism appears as gram-positive, straight or curved rods that are non-motile and that do not form spores. One or both ends may appear to be split longitudinally to give the effect of two short branches, this appearance leading to the term "bifid." One end of the organism may be bulbous or racket-shaped.

While this microorganism predominates in the intestinal tract and feces of infants fed with human milk from lactating mothers, it is not the characteristic of predominating microorganism in the intestinal tract of infants fed with other foods, such as cow's milk, or with the commercially available food preparations derived from, or based on, cow's milk. Infants so fed show a less uniform intestinal flora with an appreciable proportion of gram-negative rods and cocci.

The fact that a stable L. bifidus flora is characteristic only of the intestinal tract of breast-fed infants is now fully understood and appreciated by pediatricians and other specialists in the medical, biological, and nutritional sciences. See, for example, the publications of Tissier, Comptes rendus soc. biol., 51, pages 943–945; and 60, pages 359–361; and Ann inst. Pasteur, 19, pages 109–123; and 22, pages 189–207. See also the papers of Moro; Wein, kiln, Wochschr.; 13, pages 114–115, and Jahrb. Kinderheilk., 61, pages 676–734; and 61, pages 870–899. That the original observations of Tissier concerning the predominance of L. bifidus in nurslings' stool have been amply confirmed is pointed out in the more recent publication of Norris, Flanders, Tomarelli and Gyorgy in the Journal of Bacteriology, 60, pages 681–696 (December 1950).

In the infant colon in which a stable L. bifidus flora is lacking, it is now generally believed that the infant is more likely to suffer from disorders attributable to the growth of other bacteria, some of which are harmful to the infant, since competition for the available food supply in the infant intestinal tract where L. bifidus flourishes reduces the possibility that other bacteria, particularly the harmful B. coli., may grow in considerable numbers or in extensive colonies. In any event, where the gram-positive bacillus L. bifidus is present in large numbers in the infant intestine, which is now found only when the infant is breast-fed, there is considerably less growth of other microorganisms, particularly of the gram-negative B. coli., the Clostridia, and certain air-borne microorganisms such as the Sarcinae bacteria. While the reasons for the superior resistance to disease of breast-fed infants as compared with infants who are fed on cow's milk, or on the usual infant formulas in which cow's milk is a principal constituent, are not fully understood, pediatricians are generally agreed that in some measure, at least, the superior resistance is attributable to the presence of an extensive L. bifidus flora in the intestines of nurslings, this bacterium being absent in any considerable numbers from the intestines of infants who are not fed with human milk.

Extensive research work has been carried out on the identification and isolation of the active biological principle which is responsible for promoting the growth of L. bifidus in the intestines of infants who are nourished with human milk, which active principle is evidently not present in sufficient amount to insure the growth of L. bifidus as the predominant microorganism in the intestinal tract of infants who are fed with cow's milk or formulas based on cow's milk. This research has demonstrated that the specific growth-promoting substances or factor is probably also present, at least to some extent, in cow's milk as well as in human milk, but the amount contained in cow's milk is so small as to be only a very small percentage of the amount contained in an equal volume of human milk. It is far insufficient in quantity to provide the infant fed therewith with enough of the growth-promoting substances or factor to insure dominance of the *L. bifidus* microorganism in his colon and feces.

While the concentration of the specific growth promoting factor for *L. bifidus* in cow's milk varies to some extent with various samples of milk, and to some extent with the particular strain or variety of the *L. bifidus* microorganism which is selected for the test, ordinarily the specific growth-promoting factor is present in cow's milk only in about 1/30 the concentration (approximately 3.33%) in which it is present in human or breast milk. This concentration is evidently too low to insure that *L. bifidus* will be the predominating microorganism in the intestinal flora of infants fed with cow's milk. As only about one-half of the solid content of the commercial infant food preparation of which the analysis is given above is cow's milk, the *L. bifidus* growth promoting factor is actually present in such an infant food formula only to the extent of approximately 1/60 (approximately 1.67%) of the amount in which it is present in an equal volume of human milk. Thought has therefore been given to the possibility of adding to the infant food compositions some material or substance which would supply the specific *L. bifidus* growth-promoting substances or factor in greater amount without adversely affecting other characteristics of the composition, so that this growth-promoting factor could be present in the infant's nourishment to an extent sufficient to insure the predominance of the microorganism *L. bifidus* in his intestinal tract.

As has been previously suggested, it has now been discovered that the addition of one of a very limited group of N-substituted-d-glucosamines to an infant composition of the type described provides the growth promoting factor to support the growth of *Lactobacillus bifidus*. The compound found useful for these purposes is one of the group consisting of N-octanoyl-d-glucosamine, N-benzoyl-d-glucosamine or N-carboethoxy-d-glucosamine. These compounds are available commercially or can be prepared by known methods. For example, U.S. 2,792,388 teaches a method by which the compounds used in the present invention may be prepared. Accordingly to the method described therein, d-glucosamine hydrochloride is reacted with an acylating agent such as benzoic anhydride in the presence of a secondary or tertiary amine base in a reaction medium of a lower alkanol.

As has been suggested, the compounds used in the infant feeding composition of the present invention are included therein in small amounts. These compounds have been found to be unexpectedly more effective than other somewhat related compounds used for this purpose. This determination is made on the basis of a measurement of the growth-promoting activity of the compounds of interest. This growth-promoting activity may be expressed as the number of micrograms of the material which are necessary to give a standard response E, when tested with strains of *L. bifidus*, such as *L. bifidus* var. *penn.*, which response E is that given by 0.06 milliliter of human milk of average growth-promoting factor. The growth-promoting activity of *L. bifidus* of breast milk varies to some extent, and the standard unit, E, is based on average conditions.

In U.S. 2,708,165, it is recognized that N-acetyl-d-glucosamine possess growth-promoting activity, it being stated therein that the activity is 2,000–3,000 micrograms/E. It has been found that this activity more nearly averages about 2,800 micrograms/E. According to the present invention however, it has been found that the compounds utilized herein have a growth-promoting activity on an average of ten times that of the N-acetyl-d-glucosamine referred to when tested on a comparative basis. More importantly, however, the selected compounds of the present invention are each less toxic than the N-acetyl-d-glucosamine compound. For example, in rat studies N-octanoyl-d-glucosamine is substantially nontoxic, having an $LD_{50}$ of less than 10 g./kg. rat. Similarly, N-benzoyl-d-glucosamine and N-carboethoxy-d-glucosamine have toxicity of 7 g./kg. and 8 g./kg. respectively. This is to be contrasted with the N-acetyl-d-glucosamine which has a toxicity of 2–3 g./kg. when tested under identical conditions.

In the table below there is set forth the measure growth-promoting activity of the compounds of the present invention as compared with that of prior art, namely the N-acetyl-d-glucosamine. The data for all compounds is based on the same test conditions.

| Compound: | Micrograms/E |
|---|---|
| N-acetyl-d-glucosamine | 2,800.0 |
| N-octanoyl-d-glucosamine | 292.0 |
| N-benzoyl-d-glucosamine | 194.0 |
| N-carboethoxy-d-glucosamine | 172.0 |

As will be readily apparent, the compounds of the present invention are substantially more effective than those previously recognized as effective for this purpose. It is further interesting to note that the homologs of the discovered compounds are in each instance of an order of effectiveness and toxicity similar to that of the N-acetyl-d-glucosamine referred to above.

There is an additional and quite unexpected effect obtained with the compounds of the present invention as distinguished from those previously suggested for similar purposes. The compounds of the present invention are almost completely unabsorbed from the intestinal tract thus permitting them to reach the lower parts of the intestine and produce a better bifidus flora. This is evidenced by the data set forth in the table below, based on a series of tests carried out according to the inverted sac method, in which 5 inches of jejunum (rabbit) are washed, suspended, inverted, filled with the compound to be tested and sealed in a beaker glass maintained at 30° C.

TABLE

| Compound | Original Concentr., mg. | Outside conc. after [1]— | |
|---|---|---|---|
| | | 3 hr., mg. | 6 hr., mg. |
| N-acetyl-D-glucosamine | 500 | 250 | 200 |
| N-carboethoxy-D-glucosamine | 500 | 480 | 450 |
| N-benzoyl-D-glucosamine | 500 | 460 | 420 |
| N-capryloyl-D-glucosamine | 500 | 490 | 475 |

[1] As measured by the Morgan-Elson test and total reducing capacity, using D-glucose as a reference.

It has been found that the amount of the N-octanoyl-d-glucosamine, N-benzoyl-d-glucosamine or N-carboethoxy-d-glucosamine, which should be incorporated in an infant feeding composition, where that composition is based on cow's milk and is of the type generally described above, may range from about 0.5% to 5.0% by weight, this percentage being based on the total weight of solids present in the composition. Generally speaking, an amount of the selected compound of about 1.0% will be satisfactory.

The use of the selected compounds of the present invention in compositions of the type defined supplements the *L. bifidus* growth-promoting factor already present in the composition as a result of the cow milk content thereof. As a result, the final composition will have a growth-promoting potential for *L. bifidus* equal to or greater than that of human milk.

As will be readily apparent, variations to the described invention can be made by those skilled in the art. To the extent that such variations are within the scope of the claim appended hereto, they are to be considered as part of this invention.

The invention claimed is:

1. A composition comprising cow's milk solids and up to 5.0% by weight of a compound which will effectively promote the growth of *Lactobacillus bifidus,* said compound being selected from the group consisting of N-octanoyl-d-glucosamine, N-benzoyl-d-glucosamine and N-carboethoxy-d-glucosamine said percentage being based on the solids content of the composition.

2. A composition comprising cow's milk solids and from 0.5% to 5.0% by weight of a compound selected from the group consisting of N-octanoyl-d-glucosamine, N-benzoyl-d-glucosamine and N-carboethoxy-d-glucosamine, said percentage being by weight based on solids content of said composition.

3. A composition comprising cow's milk solids and from 0.5% to 5.0% by weight of N-octanoyl-d-glucosamine, said percentages being by weight based on the solids content of said composition.

4. A composition comprising cow's milk solids and from 0.5% to 5.0% by weight of N-benzoyl-d-glucosamine, said percentages being by weight based on the solids content of said composition.

5. A composition comprising cow's milk solids and from 0.5% to 5.0% by weight of N-carboethoxy-d-glucosamine, said percentages being by weight based on the solids content of said composition.

6. A food stuff comprising cow's milk solids containing proteins, carbohydrates and fats, but normally deficient in *L. bifidus* growth promoting substances, said food stuff containing an additive supplying said deficiency, said additive consisting of from 0.5% to 5.0% by weight based on the solids content of said food stuff, of a compound selected from the group consisting of N-octanoyl-d-glucosamine, N-benzoyl-d-glucosamine and N-carboethoxy-d-glucosamine.

References Cited by the Examiner
UNITED STATES PATENTS

| | | | |
|---|---|---|---|
| 2,710,806 | 6/1955 | Gyorgy et al. | 99—54 |
| 2,710,807 | 6/1955 | Gyorgy et al. | 99—54 |

A. LOUIS MONACELL, *Primary Examiner.*

RAYMOND N. JONES, S. E. HEYMAN,
*Assistant Examiners.*